J. R. PATTINSON.
ELECTRICALLY CONTROLLED GAS ENGINE FUEL SYSTEM.
APPLICATION FILED DEC. 5, 1917.
1,288,439.
Patented Dec. 17, 1918.
2 SHEETS—SHEET 2.
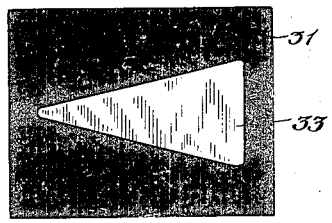
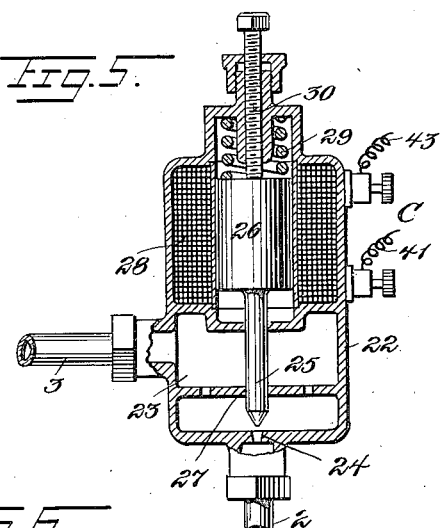
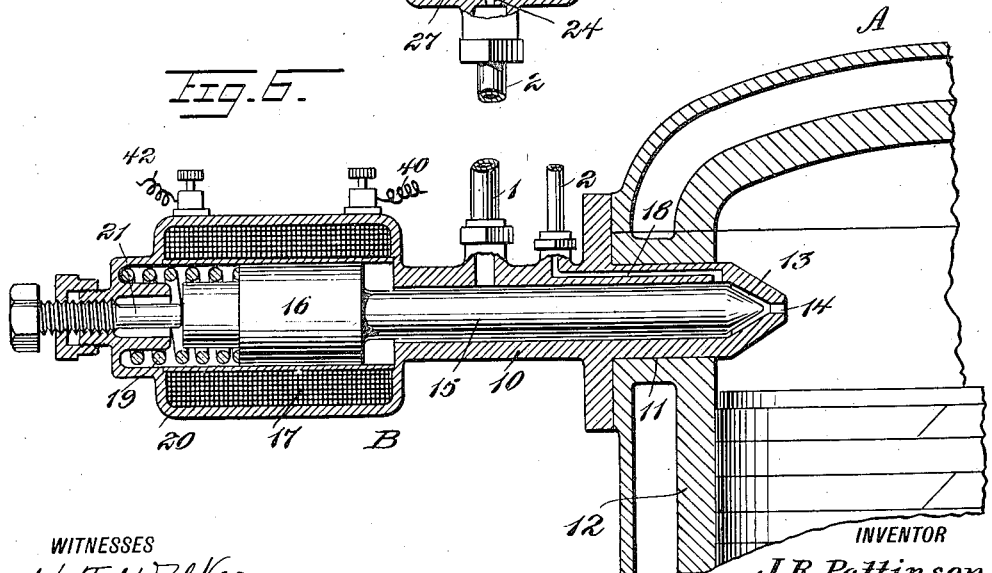
WITNESSES
H. J. Walker
C. Bradway
INVENTOR
J. R. Pattinson
BY Munn & Co
ATTORNEYS

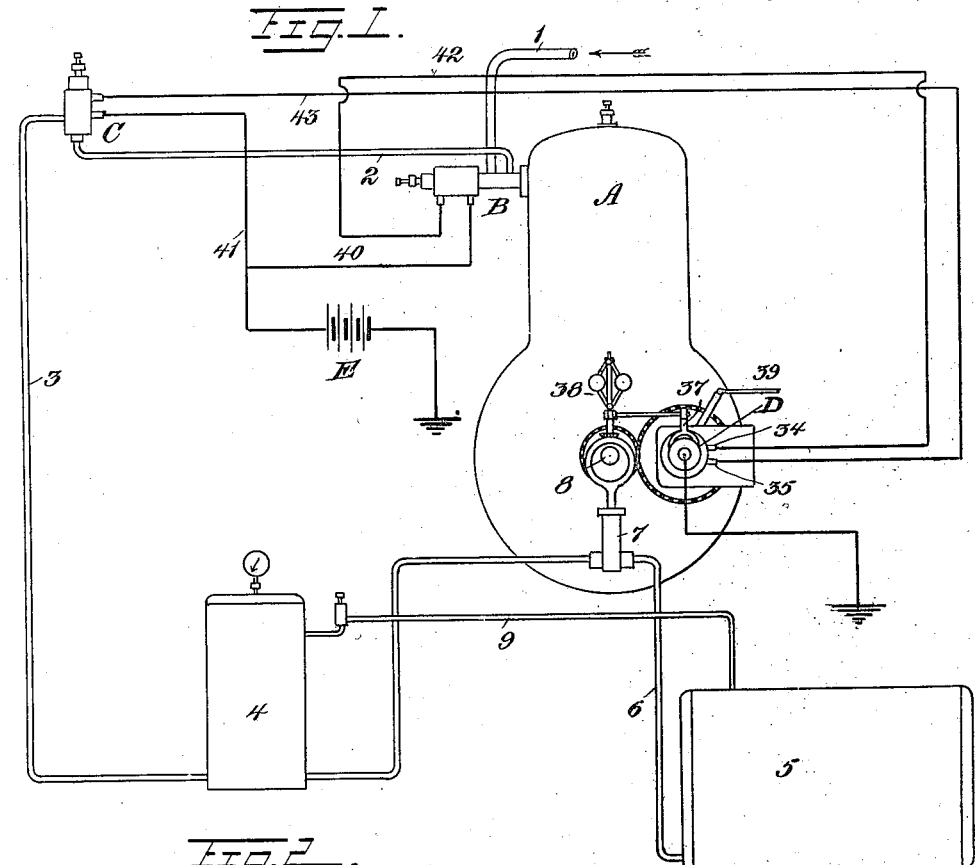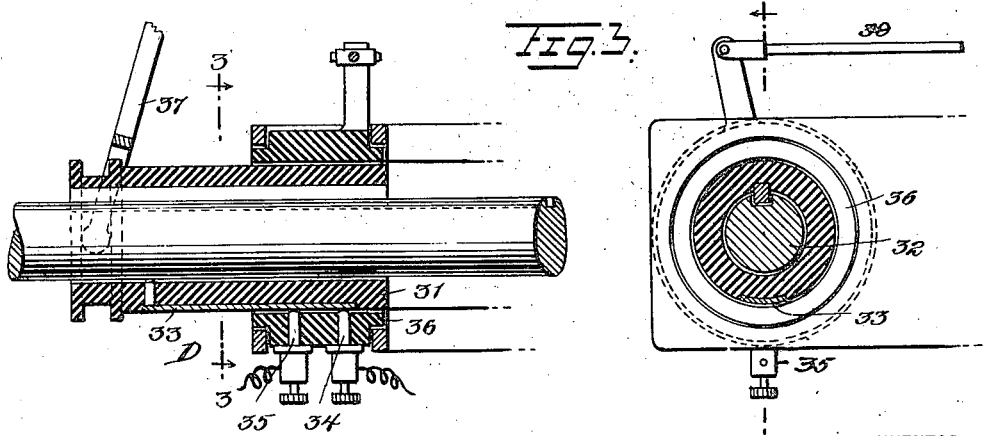

UNITED STATES PATENT OFFICE.

JOHN RALPH PATTINSON, OF HUTCHINSON, KANSAS.

ELECTRICALLY-CONTROLLED GAS-ENGINE FUEL SYSTEM.

1,288,439.

Specification of Letters Patent.   Patented Dec. 17, 1918.

Application filed December 5, 1917.   Serial No. 205,705.

*To all whom it may concern:*

Be it known that I, JOHN R. PATTINSON, a citizen of the United States, and a resident of Hutchinson, Reno county, Kansas, have invented a new and Improved Electrically-Controlled Gas-Engine Fuel System, of which the following is a full, clear, and exact description.

This invention relates to a fuel supply system for internal combustion engines of the Diesel type, although it is not necessarily limited thereto, and the invention is especially adapted for small size engines so as to do away with mechanical complications, as would be the case with mechanically-operated valves.

The invention has for its general object to provide an improved system of fuel supply for the engine, which system embodies a plurality of electrically-operated valves controlled by a make and break device driven by the engine, which make and break device can be manually regulated for variable speed rotation or automatically regulated for constant speed rotation.

A more specific object of the invention is the provision of a comparatively simple, inexpensive system of the character referred to which is reliable and efficient in use, easily controlled, and so designed as to control the liquid fuel supply and also the conjoint supply of air and fuel at the nozzle or injector of the engine.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a diagrammatic view of a gas engine with its fuel supply and controlling system;

Fig. 2 is a detail sectional view of the make and break device for the electrically-controlled valves, the section being taken on the line 2—2, Fig. 3;

Fig. 3 is a transverse section taken on the line 3—3, Fig. 2;

Fig. 4 is a development of the rotating element of the circuit make and break device;

Fig. 5 is a sectional view of the liquid fuel controlling valve; and

Fig. 6 is a detail sectional view of the injector or mixture valve.

Referring to the drawing, A designates an engine which receives its fuel supply from an injector or charging valve B that receives air under pressure from a suitable source through a pipe 1, and fuel under pressure through a pipe 2, the pipe 2 being connected with a fuel feed valve C that is connected by a pipe 3 with a pressure tank 4 for liquid fuel, such tank being supplied from a main tank 5 through a feed pipe 6 that includes a pump 7 driven from the crank shaft 8 of the engine A. Between the tanks 4 and 5 is a pressure relief by-pass 9.

The charging device B comprises a nozzle 10 which is fitted into an opening 11 in the wall 12 of the engine cylinder, and the nozzle terminates in a conical seat 13 and a discharge port 14. In the nozzle is a needle-like valve 15 having a solenoid core 16 attached thereto, which core is arranged within a solenoid winding 17. The needle valve is of less diameter than the bore of the nozzle so that air can flow along the needle valve to the nozzle orifice 14. In the wall of the nozzle is a passage 18 through which fuel flows from the pipe 2 to a point adjacent the tip of the needle valve, where the fuel encounters air and mixes with the same while it is injected into the cylinder. A spring 19 arranged in the air-tight housing 20 of the solenoid acts on the needle valve to hold the same normally seated, and the coil 17 when energized unseats the valve against the tension of the spring 19. The opening or unseating of the valve is limited by an adjustable stop 21 screwed into the end of the casing in alinement with the end of the solenoid core 16.

The fuel control valve C comprises a casing 22 having a chamber 23 that receives fuel from the pipe 3, and this chamber has a valve-controlled port 24 which is adapted to be normally engaged by a needle valve 25, which latter is carried by a solenoid core 26 and is slidable in a guide 27 in the chamber 23. The core 26 is surrounded by a solenoid winding 28 arranged in the casing 22, and a spring 29 acts on the core 26 to hold the valve 25 normally seated, and the opening movement of the valve is limited by an adjustable stop 30.

The make and break device D for controlling the circuits of the solenoids comprises a rotatable sleeve 31 of insulation on the secondary shaft 32 of the engine, and in this sleeve is mounted a triangular contact 33 with which is adapted to engage contacts or brushes 34 and 35 carried by a rotatable ring 36 of insulation which surrounds the sleeve 31. The sleeve is movable longitudinally for varying the durations of opening of the valves by varying the relation of the triangular contact 33 with the brushes. The movement of the sleeve 31 is effected by a lever 37 which is suitably connected with a speed responsive device 38 driven by the engine shaft. As the sleeve is moved to the right, Figs. 2 and 4, the brushes 34 and 35 will be in engagement with the triangular contact 33 for a shorter period of time with each revolution as the sleeve continues to move to the right, and as the sleeve moves to the left the periods of engagement or contact, and consequently the periods of opening of the valves, will be increased. By adjusting the brush-carrying ring 36 around the shaft 32 the time for opening and closing the valves with respect to the travel of the engine piston can be varied as desired, this control being effected by the operator at will through the operation of a rod 39.

When the brushes are in engagement with the contact of the make and break device current flows from the battery or other source of current E through the wires 40 and 41 to the solenoids of the valves B and C, respectively, and from these coils the current flows through the wires 42 and 43 to binding posts of the brushes 34 and 35, thence to the contact 33, which is grounded on the engine, through the engine ground to the opposite side of the battery E. The circuit of the charging valve B will be open for a longer time than the circuit for the fuel feed valve C, since part of the triangular contact 33 engaged by the brush 34 is wider than the part engaged by the brush 35. This means that the fuel supply will be cut off by the valve C before the charging valve B is closed, and consequently all the fuel will be blown out of the valve with each charge, and as a result the fuel charge can be better measured.

From the foregoing description taken in connection with the accompanying drawings, the advantages of the construction and method of operation will be readily understood by those skilled in the art to which the invention appertains, and while I have described the principle of operation, together with the system which I now consider to be the best embodiment thereof, I desire to have it understood that the system shown is merely illustrative and that such changes may be made when desired as fall within the scope of the appended claims.

Having thus described my invention, I claim as new and desire to secure by Letters Patent:

1. The combination of an engine, a fuel and air charging valve, electrically-operating means therefor, a fuel valve, electrically-operating means for the fuel valve, and a circuit make and break device driven by the engine for controlling both of the said electrically-operated means, whereby the charging valve is kept open after the fuel valve is closed.

2. The combination of an engine, a fuel and air charging valve, electrically-operating means therefor, a fuel valve, electrically-operating means for the fuel valve, and a circuit make and break device driven by the engine for controlling both of the said electrically-operated means, whereby the charging valve is kept open after the fuel valve is closed, said circuit make and break device including an adjustable element for varying the length of time the valves are open.

3. The combination of an engine, a fuel and air charging valve, electrically-operating means therefor, a fuel valve, electrically operating means for the fuel valve, and a circuit make and break device driven by the engine for controlling both of the said electrically-operated means, whereby the charging valve is kept open after the fuel valve is closed, said circuit make and break device including an adjustable element for varying the length of time the valves are open, said circuit make and break device also including means for varying the time of opening of the valves with respect to the piston of the engine.

4. The combination of an engine, an air and fuel supply valve therefor, a magnetically-operated means for the valve, a fuel valve for supplying fuel to the said first valve, an electrically-operated means for the last-mentioned valve, a triangular contact rotated by the engine, and separate contact brushes connected with the respective electrically-operated means and arranged to engage the triangular contact for opening and closing the electric circuits of the electrically-operated means.

5. The combination of an engine, an air and fuel supply valve therefor, a magnetically-operated means for the valve, a fuel valve for supplying fuel to the said first valve, an electrically-operated means for the last-mentioned valve, a triangular contact rotated by the engine, separate contact brushes connected with the respective electrically-operated means and arranged to engage the triangular contact for opening and closing the electric circuits of the electrically-operated means, and an adjustable, rotatable carrier for the said brushes.

JOHN RALPH PATTINSON.